(12) United States Patent
Dickinson et al.

(10) Patent No.: US 9,914,408 B2
(45) Date of Patent: Mar. 13, 2018

(54) FASTENER CLIP OVER A CARRIER SECURED WITH BARBS

(71) Applicant: Termax Corporation, Lake Zurich, IL (US)

(72) Inventors: Daniel James Dickinson, Lincolnshire, IL (US); Michael Walter Smith, Palatine, IL (US); Michael Tirrell, Volo, IL (US)

(73) Assignee: TERMAX LLC, Lake Zurich, IL (US)

( * ) Notice: Subject to any disclaimer, the term of this patent is extended or adjusted under 35 U.S.C. 154(b) by 0 days.

(21) Appl. No.: 14/918,929

(22) Filed: Oct. 21, 2015

(65) Prior Publication Data

US 2017/0113632 A1    Apr. 27, 2017

(51) Int. Cl.
| | | |
|---|---|---|
| B60R 13/08 | (2006.01) | |
| B60R 13/02 | (2006.01) | |
| B60R 13/04 | (2006.01) | |
| F16B 2/24 | (2006.01) | |
| F16B 2/22 | (2006.01) | |

(52) U.S. Cl.
CPC .............. *B60R 13/08* (2013.01); *B60R 13/02* (2013.01); *B60R 13/0206* (2013.01); *B60R 13/0212* (2013.01); *B60R 13/04* (2013.01); *B60R 13/043* (2013.01); *F16B 2/22* (2013.01); *F16B 2/24* (2013.01); *B60R 2013/0807* (2013.01)

(58) Field of Classification Search
CPC .. F16B 5/0657; F16B 2/22; F16B 2/24; B60R 13/0206; B60R 13/02; B60R 13/08; B60R 13/0212; B60R 13/04; B60R 13/043; B60R 2013/0807; Y10T 24/30; Y10T 24/309
USPC .................................................. 24/292–297
See application file for complete search history.

(56) References Cited

U.S. PATENT DOCUMENTS 6,438,804 B1 * 8/2002 Romero Magarino ........... B60R 13/0206
24/289
7,444,721 B2 * 11/2008 Smith ................... F16B 5/0657
24/297

* cited by examiner

*Primary Examiner* — Robert Sandy

(57) ABSTRACT

A fastener clip system including a carrier and a fastener clip configured to fit over the carrier. The fastener clip includes at least one wing, where the at least one wing is configured to engage a slot in a surface, and one or more barbs that are configured to secure the fastener clip to the carrier. The barbs may include gussets that are configured to increase a bending resistance of the barbs.

14 Claims, 6 Drawing Sheets

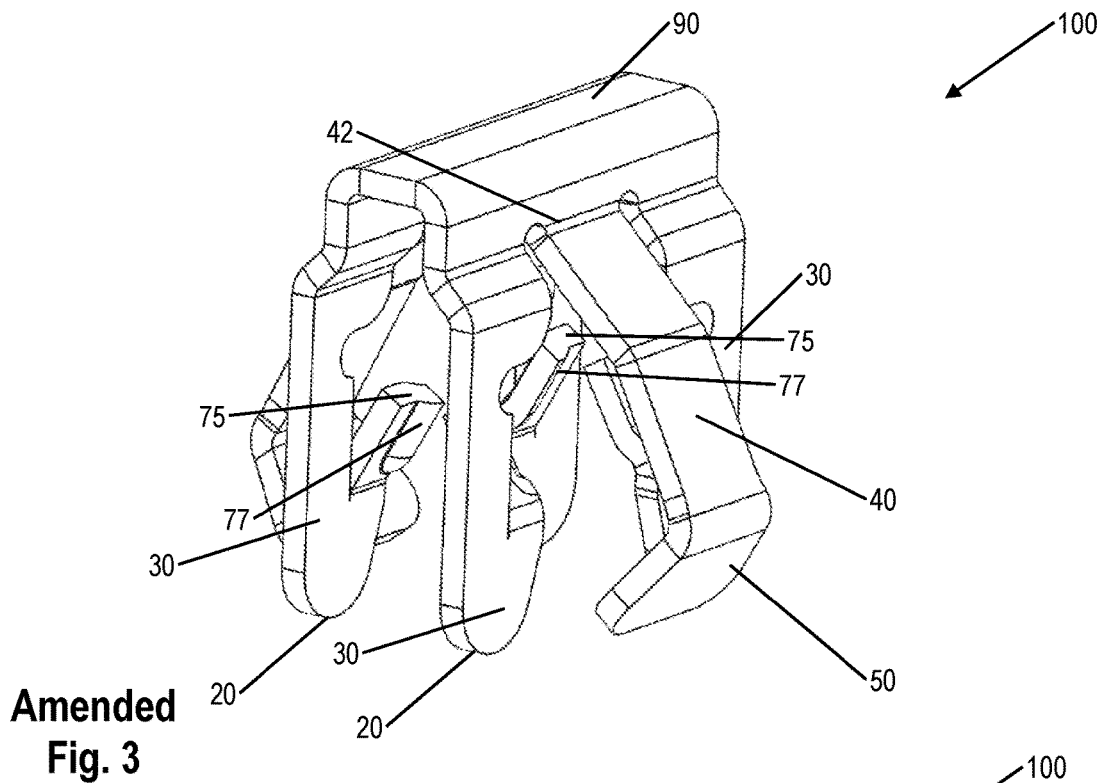
Amended Fig. 3
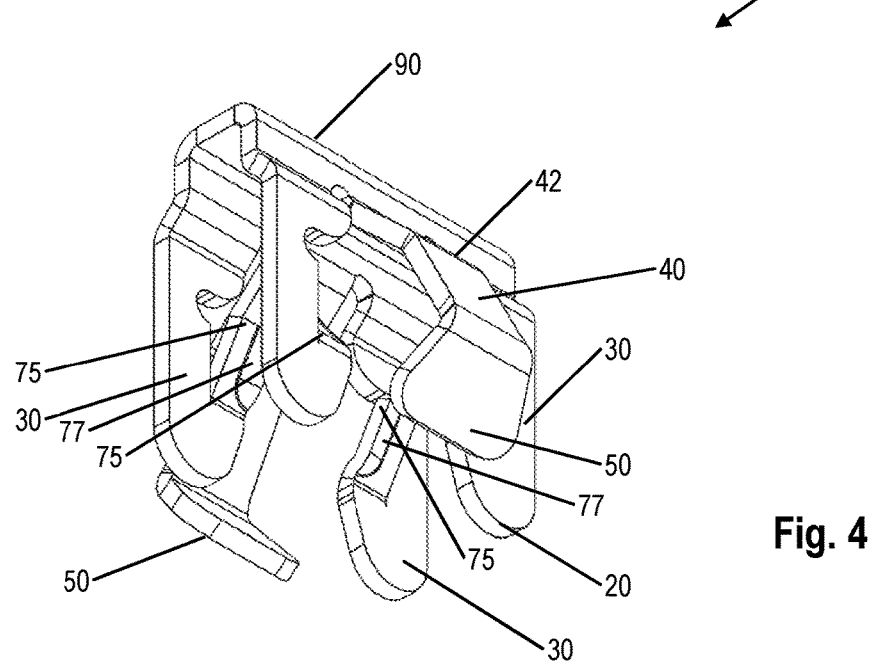
Fig. 4

FASTENER CLIP OVER A CARRIER SECURED WITH BARBS

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, headliner, or any interior trim piece. Additionally, the panel may be any suitable exterior body panel, such as a fender, bumper, quarter panel, or door panel. The chassis of the vehicle may include any substrate, plate, body panel, structural framework, chassis component or subcomponent, wall, or any other such suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, conventional fasteners typically do not adequately secure the panel to the vehicle chassis having sheet metal with different curvature or thicknesses throughout. In addition, conventional fasteners are not suitable under a variety of environmental conditions, such as in the presence of vibration at various levels of amplitude and frequency. For example, the fastener device should prevent or minimize the amount of buzzing, rattling, or any other type of noise that may cause attention to the occupants of the vehicle or otherwise weaken the attachment. In addition, conventional fasteners do not adequately accommodate various levels of production tolerances, such as various dimensions amongst, for example, the body panels as well as the vehicle chassis. Thus, conventional fastener devices typically do not adequately fasten to a range of sheet metal thicknesses and do not minimize or eliminate buzzing and rattling and do not sufficiently accommodate variations in production tolerances.

Fastener clips, such as metal spring fasteners, are known for attaching body panels to an automobile chassis. For example, fastener clips are known having a base plate and four stepped arms extending from the base plate. Each stepped arm includes four incremental steps (stair-steps) suitable for engaging a slot in a vehicle chassis with one of the steps on each arm. The incremental steps allow for engagement, however, in only one of the four discrete step positions rather than over a continuous range of engagement positions. Further, each step has a relatively large rise and run so that, once inserted, movement of the fastener clip within the range of a step size may occur, resulting in wear and/or the generation of noise, including buzzing and rattling as a result of vibrations occurring within the vehicle. In addition, the steps typically cut onto each arm during manufacture and require twisting of each wing on the fastener clip in order to engage the slot in the vehicle chassis. As a result, only an edge or a portion of an edge of each of the steps engages the hole in the vehicle slot.

If the sheet metal varies in thickness or if tolerances in production of the slot in the vehicle chassis or in the trim-piece exist, for example, then engagement of one portion of the hole in the chassis with one of the arms may not provide suitable frictional engagement or otherwise result in movement. Further, less than all four of the arms will make engagement with the slot of the vehicle chassis. Twisting of the body panel will be likely more prevalent because less than four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

B. BRIEF DESCRIPTION OF THE DRAWINGS

Other objects and advantages of the invention may become apparent upon reading the detailed description and upon reference to the accompanying drawings.

FIG. 3 is a perspective view of a fastener clip, in accordance with some embodiments.

FIG. 4 is another perspective view of a fastener clip, in accordance with some embodiments.

Figure 1:
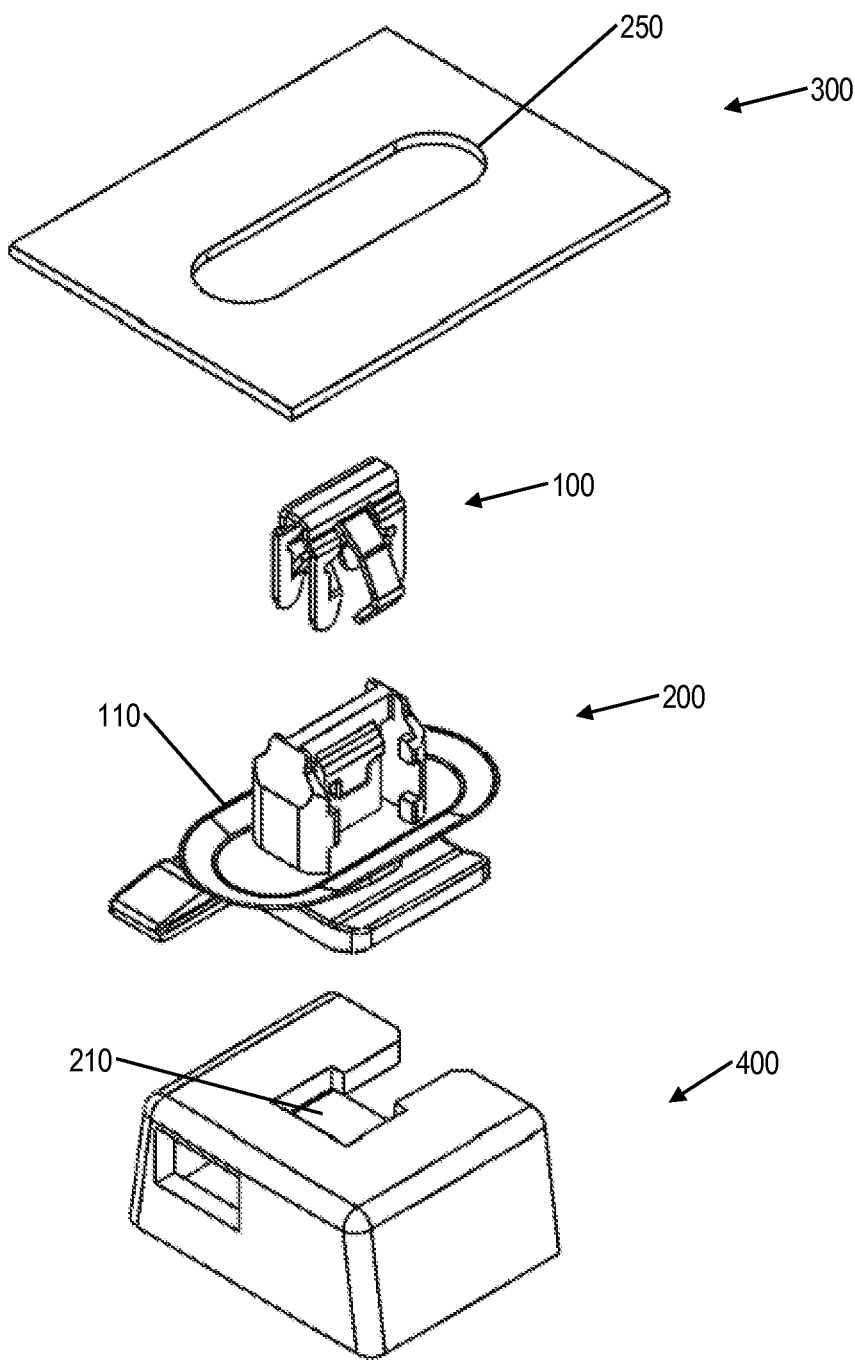
FIG. 1 is an exploded view of a fastener clip assembly, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

A fastener clip includes first and second feet and a first and second pair of laterally offset legs extending from the first and second feet. At least one first wing extends from the first pair of laterally offset legs. The at least one first wing has an engagement region. At least one second wing extends from the second pair of laterally offset legs. The at least one second wing also has an engagement region. The engagement regions include a depressed portion operable to adapt to variations or movement of a slot. In some embodiments, the fastener clip may be made primarily of metal—such as spring steel, carbon spring steel, full hard stainless steel, etc. In other embodiments, hard plastic material may be used. Other suitable materials may also be used.

The fastener clip may be configured to fit over a carrier. In some embodiments, the carrier may be made from various plastic or rubber compositions. The carrier may be configured to provide additional support to the fastener clip while providing the fastener clip with some give. In some embodiments, the carrier enables the assembly of the clip and the carrier to have more resistance to rattling, buzzing, and general vibration. In some embodiments, the carrier may comprise a top and a bottom seal configured to form a seal with a top and a bottom surface respectively, where the top and the bottom surfaces are the surfaces that are being fastened using the fastener clip.

In some embodiments, the carrier may be made of plastic nylon, polyoxymethylene (POM, also known as acetal), ABS, Polypropylene, rubber materials of various hardness, etc. In some embodiments, the carrier may be injection molded.

In some embodiments, the carrier may be configured to attach to a clip carrier housing (or housing for short) that may be, for example, attached to or be part of a body panel (one of the parts being fastened).

In some embodiments, the fastener clip assembly may have a high level of extraction force, yet the fastener clip may securely and relatively easily facilitate attachment of a body panel, such as an interior or exterior body panel, with the first engagement structure such as the vehicle chassis. The fastener clip may also be suitable for use in heavy-duty applications such as visor mounting, headliners, and pull-handle fasteners. The wings have an engagement region, size, such as a width, length, thickness, and pivot point to provide very high extraction force levels while the insertion force level is relatively low.

Further, the fastener clip may be used with different sheet metal thicknesses and curvatures. For example, a vehicle may have different sheet metal thicknesses at various parts of the vehicle. The range of slot thicknesses varies continuously from a minimum thickness to a maximum thickness. For example, the minimum thickness may be 0.25 mm or less and the maximum thickness may be 6.0 mm or more. The fastener clip is configured to be inserted into the slot defined in a first engagement structure, such as a vehicle chassis. Since the fastener clip is configured to adapt automatically to different sheet metal thicknesses and curvatures, the same fastener clip may be used throughout the vehicle thus eliminating the need for specific fastener clips for specific slot thicknesses.

The engagement portion, along with an optional engagement tab on each wing, permits relatively easy insertion of the fastener clip into a slot formed within the vehicle chassis while providing a relatively high level of extraction force from the vehicle chassis. Assembly of the body panel onto the vehicle chassis requires a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis may result in fewer injuries to the assembly workers, including injuries related to repetitive stress syndrome. By eliminating conventional screws for fastening to the roof, assembly of the visor and headliner to the roof with the fastener significantly reduces assembly and servicing time and cost. Further, by eliminating multiple fasteners for different sheet metal thicknesses, confusion during assembly is eliminated/reduced since the same type fastener may be used for all slots. Thus, an assembly worker need not worry about selecting the wrong fastener for different slot thicknesses.

The relatively high level of extraction force, characteristic of the fastener clip, securely attaches the body panel, such as an interior trim piece or headliner, to the vehicle chassis such as a roof. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals or metal to plastic with respect to the vehicle chassis components and/or between plastic components such as the interior trim panels attached to the metal vehicle chassis. Yet another advantage is that the fastener clip is relatively easy to manufacture using relatively inexpensive manufacturing processes and materials. The use of the fastener clip decreases production costs, increases worker productivity and efficiency and decreases overall vehicle assembly costs. The fastener clip securely attaches any suitable body panel to the vehicle chassis, such that the fastener clip improves reliability both in the short term and in the long term, while further improving vehicle safety and quality.

The fastener clip together with the help of the carrier dampens vibrations and thus eliminates or substantially reduces buzz, squeak, and rattles. The fastener clip and carrier continuously adapt to changes in environmental conditions such as vehicle flexing, vibration and thermal expansion. For example, the fastener clip and carrier may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip and carrier may be made of anti-corrosive material such as plastic or treated metal to provide long reliable service life.

Figure 2:
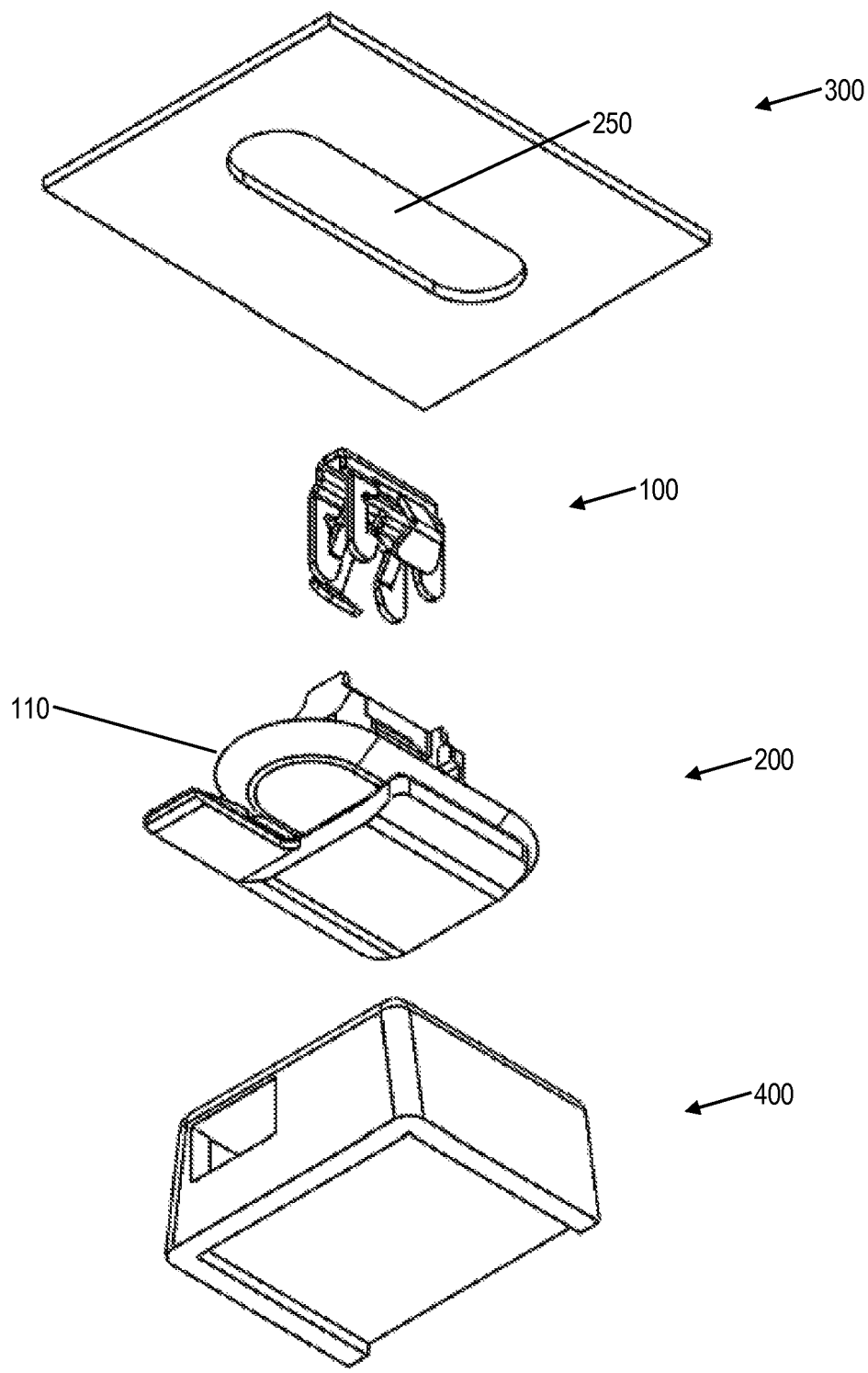
FIG. 2 is another exploded view of a fastener clip assembly, in accordance with some embodiments.

FIG. 1 is an exploded view of a fastener clip assembly, in accordance with some embodiments. FIG. 2 is another exploded view of a fastener clip assembly, in accordance with some embodiments.

In some embodiments, fastener clip 100 is configured to fit over carrier 200. The carrier 200 may be configured to provide additional support to the fastener clip 100 as well as provide the fastener clip 100 with more flexibility and render fastener clip 100 less prone to vibration while engaging and fastening surfaces together. In some embodiments, the carrier may comprise a top lip 110. The top lip 110 (and optionally a bottom lip) may be configured to form a seal with a top (and optionally a bottom) surface.

In some embodiments, fastener clip 100 and carrier 200 are configured to fasten together top surface 300 and carrier clip housing (or housing) 400. Receiver 210 on housing 400 is configured to receive carrier 200 and secure carrier 200 to housing 400. Carrier 200 is configured to receive fastener clip 100 and to secure fastener clip 100 on carrier 200.

Fastener clip 100 is configured to be inserted through slot 250 of top surface 300 and to secure itself to the top surface 300 as discussed herein. In some embodiments, the fastener clip is configured to fasten together top surface 300 and housing 400 (and the part to which housing 400 is attached).

In some embodiments, housing 400 may be part of a body panel (housing 400 may be either attached to or molded onto the body panel) and surface 300 may be part of an automobile frame. Accordingly, the fastener clip assembly may be configured to fasten together a body panel to an automobile frame.

Figure 5:
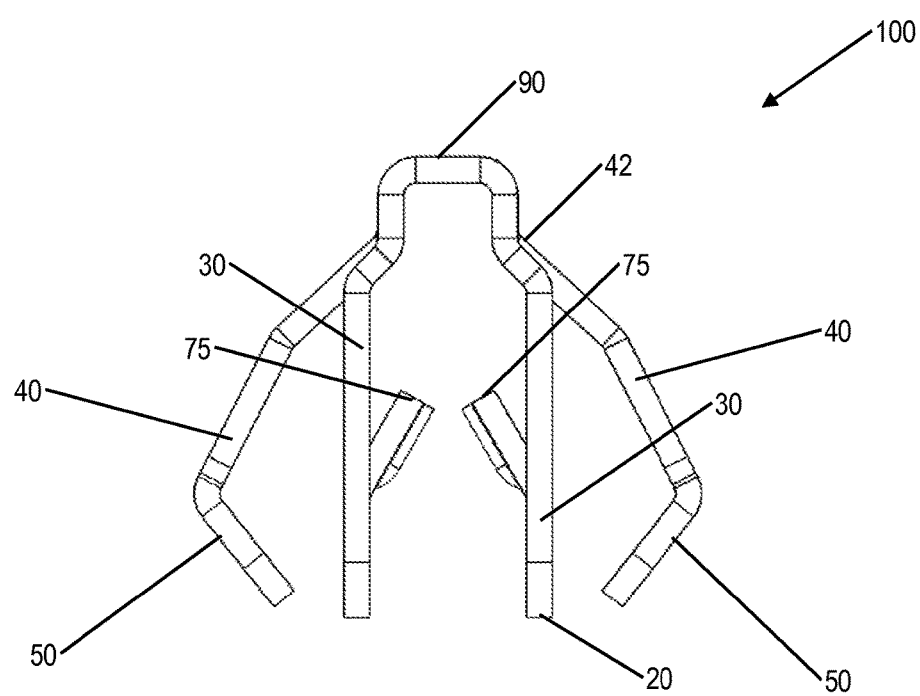
FIG. 5 is a side view of a fastener clip, in accordance with some embodiments.

FIG. 3 is a perspective view of a fastener clip, in accordance with some embodiments. FIG. 4 is another perspective view of a fastener clip, in accordance with some embodiments. FIG. 5 is a side view of a fastener clip, in accordance with some embodiments.

Fastener clip 100 includes first and second feet 20 and a first and second pair of laterally offset legs 30 extending respectively from first and second feet 20. At least one first wing 40 extends from the first pair of laterally offset legs 30. The at least one first wing 40 has an engagement region 50. At least one second wing 40 extends from the second pair of laterally offset legs 30, also with an engagement region 50. The at least one first wing 40 extends from the first pair of laterally offset legs 30 near the top portion 90 opposite from the first and second feet 20. Similarly, the at least one second wing 40 extends from the second pair of laterally offset legs 30 near the top portion 90 opposite from the first and second feet 20.

In some embodiments, the fastener clip 100 may be configured to fit over a carrier for additional support and flexibility, among other reasons.

The top portion 90 may slope down toward a first and a second side of fastener clip 100 such that the fastener clip may be more easily inserted into a corresponding slot in one of the surfaces to which the clip is to be fastened.

Although reference number 30 refers to both pairs of legs and reference number 40 refers to wings 40 on both pairs of legs 30, it is understood that the at least one first wing 40 corresponds to the first pair of legs 30 and the at least one second wing 40 corresponds to the second pair of legs 30.

Although the fastener clip 100 is shown with four legs 30 and two wings 40, any suitable number of legs 30 and wings 40 may be used. For example, two legs 30 and two wings 40 may be used, two legs 30 and four wings 40 may be used, three legs 30, four legs 30 an so forth may be used. According to one embodiment, the legs 30 may have any suitable shape, such as for example, the legs are tapered, straight, curved, or any suitable shape.

The wings 40 have a size, such as a width, length, thickness and a pivot point 42 to provide very high extraction force levels while the insertion force level is relatively very low. For example, the pivot point 42 may be weakened by scoring, stamping, bending or cutting, or any suitable means on wing 40 to ensure that the wings 40 spring inward as required so that the insertion force is low relative to the extraction force. Since the wings 40 are in compression during extraction, the weakened pivot point 42 does not significantly weaken the extraction force yet the insertion force is reduced. Additionally, the width of the wing 40 may be increased to further increase the strength of the wing and thus increase the extraction force, as well as increase the size of the engagement region. Alternatively, the width of the wing may be decreased, or the wings may have different widths and engagement regions 50 to achieve any desired insertion force or extraction force.

In some embodiments, fastener clip 100 may also comprise barbs 75. In some embodiments, barbs 75 may be configured to secure fastener clip 100 to a carrier over which the fastener is configured to fit. In some embodiments, barbs 75 are bent towards the inside of the fastener clip. By inserting the fastener clip over the carrier, the barbs bend outward and then bend back into their original position under corresponding retaining ledges on the carrier in order to secure the clip to the carrier.

In some embodiments, various types of gussets may be formed on barbs 75 in order to make the barbs stronger to bending. In some embodiments, with stronger barbs 75, a higher force is required to separate clip 100 from the carrier. In some embodiments, one or more bends may be formed in the barbs in order to enhance the gussets' strength. Such gussets 77 in the barbs may be seen in FIG. 2. In some embodiments, the gussets 77 may be stamped into the metal forming barbs 75.

Figure 6:
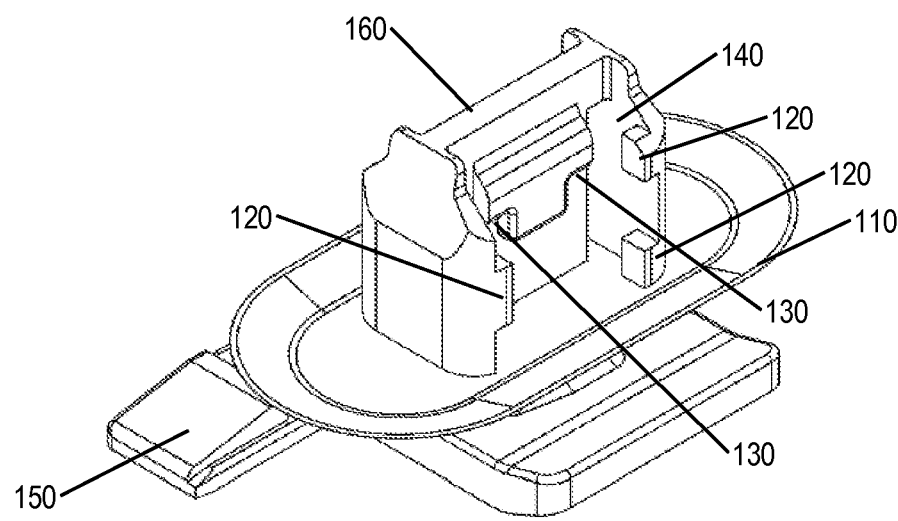
FIG. 6 is a perspective view of a carrier, in accordance with some embodiments.
Figure 7:
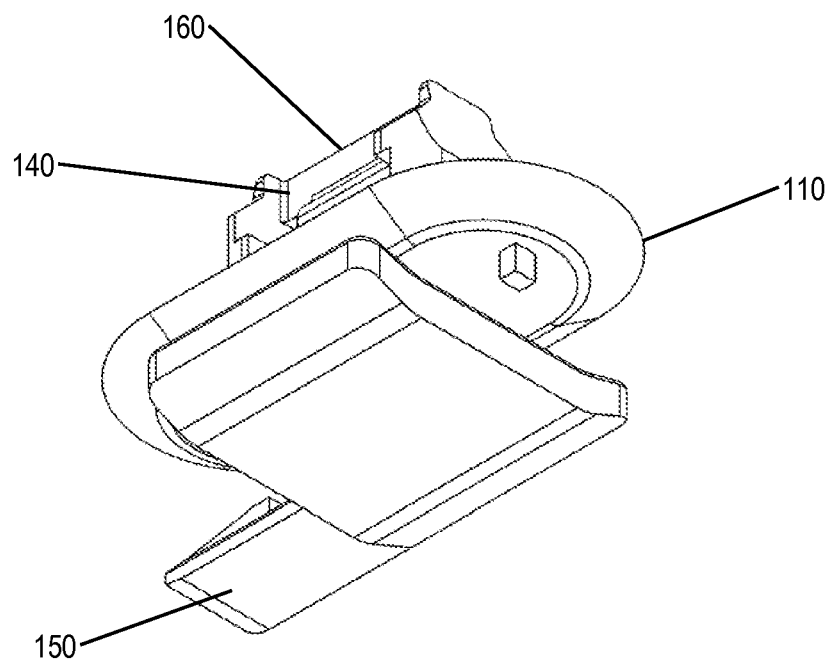
FIG. 7 is another perspective view of a carrier, in accordance with some embodiments.

FIG. 6 is a perspective view of a carrier, in accordance with some embodiments. FIG. 7 is another perspective view of a carrier, in accordance with some embodiments.

In some embodiments, carrier 200 is configured to receive fastener clip 100, which is configured to fit over and attach to carrier 200. In some embodiments, the carrier may be configured to provide additional support to the fastener clip as well as provide the fastener clip with more flexibility and render the fastener clip less prone to vibration and rattling. In some embodiments, the carrier may comprise a top lip 110 (and optionally a bottom lip) configured to form a seal against a top (and optionally a bottom) surface.

In some embodiments, carrier 200 may also comprise a top surface 160, and at least channels 140 (four channels, in some embodiments), which are configured to receive and guide corresponding parts of a clip over the carrier for attachment. In some embodiments, barbs on the clip are configured to engage retaining ledges 130 on the carrier in order to secure the clip to the carrier.

In some embodiments, carrier 200 may also include tabs 120 (four sets of tabs, in some embodiments), which are configured to provide additional support to a clip that is configured to fit over the carrier. In FIGS. 6 and 7, two tabs are shown on the far side and one tab is shown on the near side of the carrier. In some embodiments, the opposite configuration may be used on the opposite side of the carrier (not shown here): two tabs on the opposite near side and one tab on the opposite far side. In some embodiments, such a configuration for the tabs facilitates an easier injection molding process in embodiments where the carrier is manufactured using an injection molding process.

In some embodiments, carrier 200 is configured to secure itself onto a housing using hook 150. Hook 150 is configured to slide into a corresponding receiver in the housing in order to secure the carrier to the housing.

In some embodiments, carrier 200 may be manufactured with injection molding using materials such as plastic nylon, polyoxymethylene (POM, also known as acetal), ABS, Polypropylene, rubber materials of various hardness, etc.

Figure 8:
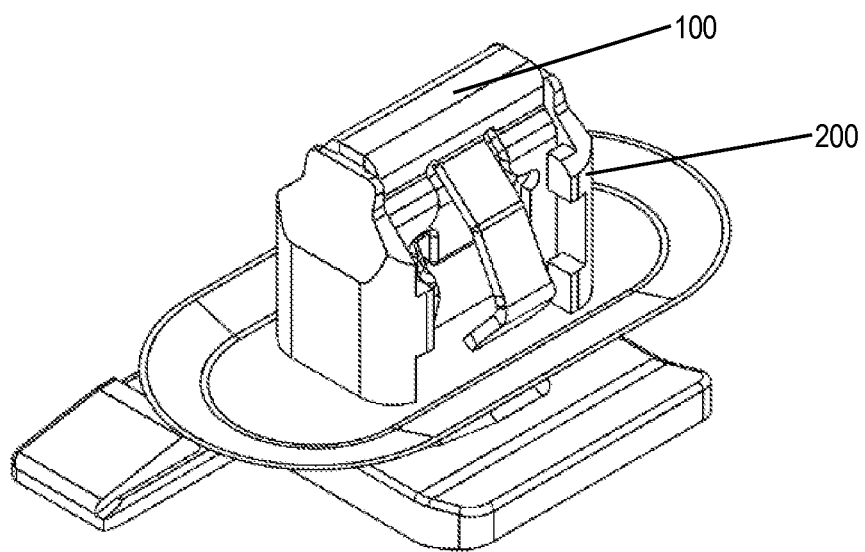
FIG. 8 is an assembled view of a fastener clip assembly, in accordance with some embodiments.

FIG. 8 is an assembled view of a fastener clip assembly, in accordance with some embodiments.

Figure 9:
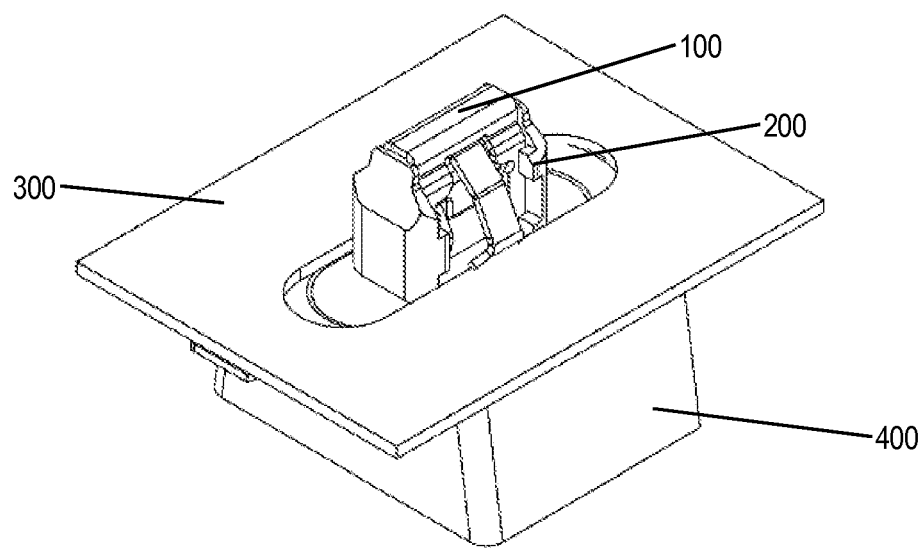
FIG. 9 is an assembled view of a fastener clip assembly as it may be installed, in accordance with some embodiments.

FIG. 9 is an assembled view of a fastener clip assembly as it may be installed, in accordance with some embodiments.

Fastener clip 100 and carrier 200 are configured to join surface 300 to housing 400. Shown in FIG. 8 is an assembled form of fastener clip 100 and carrier 200. Shown in FIG. 9 is an assembled, in-use example of fastener clip 100, carrier 200, as well as surface 300 and housing 400, which are joined by the fastener clip/carrier.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip system comprising:
   a carrier, wherein the carrier is configured to attach to a housing, wherein the housing is configured to attach to a body panel; and
   a fastener clip configured to fit over the carrier, wherein the fastener clip is configured to attach to a chassis through a slot in the chassis, wherein the fastener clip comprises:
     at least one wing, wherein the at least one wing is configured to engage a slot in a surface;
     one or more barbs that are configured to secure the fastener clip to corresponding retaining ledges on the carrier, wherein the barbs comprise gussets configured to increase a bending resistance of the barbs, wherein the gussets extend along the barbs to points of contact between the barbs and the retaining ledges on the carrier.

2. The fastener clip system of claim 1, wherein the fastener clip is constructed from at least one of: spring steel, carbon spring steel, full hard stainless steel, hard plastic.

3. The fastener clip system of claim 1, wherein the carrier is constructed of at least one of: plastic nylon, polyoxymethylene, ABS, Polypropylene, and rubber materials of various hardness.

4. The fastener clip system of claim 1, wherein the carrier further comprises tabs that are configured to additionally secure the fastener clip to the carrier.

5. The fastener clip system of claim 1, further comprising forming the carrier using injection molding.

6. The fastener clip system of claim 1, wherein the carrier compromises a top lip, wherein the top lip is configured to form a seal against the chassis.

7. A fastener assembly comprising:
   a body panel comprising a housing attached to the body panel;
   a carrier configured to attach to the housing;
   a fastener clip configured to fit over and attach to the carrier; and
   a chassis section comprising a slot, wherein the fastener clip is configured to attach to the chassis through the slot,
   wherein the fastener clip comprises:
     at least one wing, wherein the at least one wing is configured to engage a slot in a surface;
     one or more barbs that are configured to secure the fastener clip to the carrier, wherein the barbs comprise gussets configured to increase a bending resistance of the barbs.

8. The fastener assembly system of claim 7, wherein the fastener clip is constructed from at least one of: spring steel, carbon spring steel, full hard stainless steel, hard plastic.

9. The fastener assembly system of claim 7, wherein the carrier is constructed of at least one of: plastic nylon, polyoxymethylene, ABS, Polypropylene, and rubber materials of various hardness.

10. The fastener assembly system of claim 7, wherein the carrier further comprises tabs that are configured to additionally secure the fastener clip to the carrier.

11. The fastener assembly system of claim 7, wherein the barbs are configured to attach to corresponding retaining ledges on the carrier.

12. The fastener assembly system of claim 7, wherein the carrier is configured to be secured to a housing.

13. The fastener assembly system of claim 12, further comprising forming the carrier using injection molding.

14. The fastener assembly system of claim 7, wherein the carrier compromises a top lip, wherein the top lip is configured to form a seal against a contacting surface.

* * * * *